US007856558B2

(12) United States Patent
Martin et al.

(10) Patent No.: US 7,856,558 B2
(45) Date of Patent: Dec. 21, 2010

(54) BIOMETRIC VERIFICATION AND DURESS DETECTION SYSTEM AND METHOD

(75) Inventors: Christopher D. Martin, Plainview, NY (US); Eric Oh, Brooklyn, NY (US); Kenneth L. Addy, Massapequa, NY (US); Kenneth G. Eskildsen, Great Neck, NY (US)

(73) Assignee: Honeywell International Inc., Morristown, NJ (US)

( * ) Notice: Subject to any disclaimer, the term of this patent is extended or adjusted under 35 U.S.C. 154(b) by 914 days.

(21) Appl. No.: 11/788,678

(22) Filed: Apr. 20, 2007

(65) Prior Publication Data

US 2007/0198850 A1 Aug. 23, 2007

Related U.S. Application Data

(63) Continuation-in-part of application No. 10/970,198, filed on Oct. 21, 2004, now abandoned.

(51) Int. Cl.
*G06F 21/00* (2006.01)
*G06F 7/04* (2006.01)
*G06K 9/00* (2006.01)

(52) U.S. Cl. ...................... 713/186; 382/115; 340/5.81; 340/5.82

(58) Field of Classification Search ................. 382/115; 340/5.81, 5.52, 5.82; 713/186
See application file for complete search history.

(56) References Cited

U.S. PATENT DOCUMENTS

| | | | | |
|---|---|---|---|---|
| 6,848,052 | B2 * | 1/2005 | Hamid et al. | 713/186 |
| 6,970,183 | B1 * | 11/2005 | Monroe | 348/143 |
| 7,301,451 | B2 * | 11/2007 | Hastings | 340/539.12 |
| 7,616,784 | B2 * | 11/2009 | Kocher | 382/115 |
| 7,726,557 | B2 * | 6/2010 | Bosch et al. | 235/379 |
| 2002/0038818 | A1 * | 4/2002 | Zingher et al. | 235/381 |
| 2002/0112183 | A1 * | 8/2002 | Baird et al. | 713/201 |
| 2003/0174049 | A1 * | 9/2003 | Beigel et al. | 340/10.42 |
| 2004/0133495 | A1 * | 7/2004 | Bosch et al. | 705/35 |
| 2004/0232221 | A1 * | 11/2004 | Beenau et al. | 235/380 |
| 2005/0001712 | A1 * | 1/2005 | Yarbrough | 340/5.82 |
| 2006/0072793 | A1 * | 4/2006 | Determan | 382/117 |
| 2006/0075230 | A1 * | 4/2006 | Baird et al. | 713/168 |
| 2006/0112279 | A1 * | 5/2006 | Cohen et al. | 713/186 |
| 2006/0262480 | A1 * | 11/2006 | Stewart | 361/251 |
| 2008/0229400 | A1 * | 9/2008 | Burke | 726/7 |
| 2009/0294523 | A1 * | 12/2009 | Marano et al. | 235/380 |

* cited by examiner

*Primary Examiner*—Techane J Gergiso
(74) *Attorney, Agent, or Firm*—Husch Blackwell LLP Welsh Katz

(57) ABSTRACT

A multi-stage verification system including a first and second identification device to verify the identity of the user and to determine if the user is under duress. When a user approaches an entrance to a building, a first identifier is detected by the first identification device, the identifier is compared to a pre-stored identifier. If there is a match, the user inputs at least one biometric input into the second identification device. The biometric input is compares with pre-stored information in two different databases, a biometric template database and a duress indicator database. If there is a match with the duress indicator database, a silent alarm signal is transmitted to a central monitoring station and the security system is disarmed. If there is a match with the biometric template database, the security system is controlled in the intended manner.

19 Claims, 9 Drawing Sheets

BIOMETRIC VERIFICATION AND DURESS DETECTION SYSTEM AND METHOD

RELATED APPLICATION

This application is a continuation-in-part of U.S. patent application Ser. No. 10/970,198 filed on Oct. 21, 2004 now abandoned entitled "Voice Authenticated Alarm Exit and Entry System", and assigned to Honeywell International, Inc.

BACKGROUND OF THE INVENTION

1. Field of Invention

The present invention relates generally to the field of security systems and biometric identification system. Further, the present invention relates to security systems that use biometric activation technology to aid in the secure activation and deactivation of the security system.

2. Description of Related Art

Currently available wireless security systems for commercial or home use typically include a hardwired or wireless keypad, an alarm base station and an alarm siren in addition to various additional optional hardware features. Due to the increasing complexity of security systems, a need has arisen to simplify the efforts a human user has to employ in order to control the security system. Examples of technologies that have been implemented within security systems to simplify operations for the user include voice authentication, short-range active RF wireless tags and passive proximity tags.

However, the above-mentioned technologies, even though implemented to simplify the operations of security systems, have several performance disadvantages. For example, voice or other biometric authentication technologies, while presenting a simple user interface for the activation and deactivation of a security system, may not be sufficient by themselves to ensure adequate security. Wireless tags (active RF and passive proximity) have the advantage of low cost, hands free operation and functional reliability. However, wireless tags provide significant security breach issues if the wireless tag is either lost or stolen, in which case the security system enabled with wireless tag technology will only validate the wireless tag and not the potentially unauthorized individual who possesses the tag.

Even when the individual who possesses the tag is also the authorized person, there is still a chance for a significant security breach. For example, a burglar can force an authorized person to present the wireless tag or enter a unique passcode to disarm the security system. Since the person is authorized, the system will be disarmed, even if the person verifies his identification.

BRIEF SUMMARY OF THE INVENTION

The present invention addresses the above identified problems, potential security breach and other issues by providing a security system wherein the user is provided with dual layered verification system in addition to an unique identifier given to the user. In particular, the user is either given a wireless tag with a unique identifier or a unique passcode that is entered into the security system for identification. The present invention relates to a system and method for providing a biometric authenticated entry and exit interface of a security system situated within a home or business environment used to verify the identity of a user and confirm that the user is not under duress because of an intruder. The system uses a combination of biometric authenticating technology and unique identification technology. Through the leveraging of the two independent technologies into a unique configuration, the assets of the respective technologies can be used to overcome any security concerns that may arise when the technologies are implemented individually.

The biometric security system comprises a first identification device for detecting an identifier associated with a user and a second identification device for obtaining biometric data of the user. The system includes a database for storing the identifier, at least one biometric template and at least one duress indicator. The system further includes a processor for detecting an identity of the user and that the user is not under duress. The identity of a person is determined by matching the detected identifier with a stored identifier and matching the biometric data with the at least one biometric template. Duress is determined by matching the biometric data with the at least one duress indicator. The processor controls the security system based upon the determination.

If the processor determines that the biometric data matches at least one duress indicator, the processor transmits a duress signal to a central monitoring station and disarms the security system.

The second identification device can be a voice detector, a fingerprint detector, a retinal or iris pattern detector, a camera or a facial pattern detector.

A corresponding method is also provided.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

Figure 1:
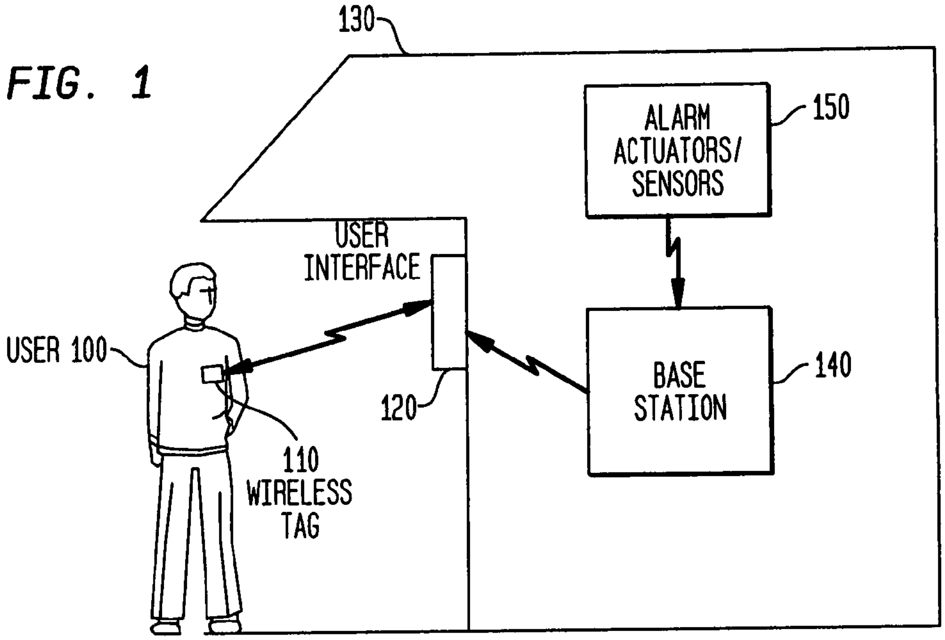
FIG. 1 illustrates an example of a biometric user interface and base station in a secured building, where the biometric user interface detects a wireless tag carried by a user.

FIG. 1 illustrates an example of a biometric user interface and base station in a secured building, where the biometric user interface detects a wireless tag carried by a user. Many homes and businesses today are equipped with security systems to deter burglaries and detect fires or other hazards, and to control access to different rooms in a building, for example. A security system typically includes a central base station, e.g., control panel, 140, which communicates with a number of peripheral sensors and actuators 150 via a wired or wireless path to secure a building 130. For example, the base station 140 may receive signals from motion, window and door sensors that detect when a person enters a room, or opens a window or door, respectively. Other components such as panic alarms and medical monitoring devices may also communicate with the base station 140. Signals received from fire sensors, such as smoke or heat sensors, indicate that a fire has been detected. When an alarm condition is detected, such as an intrusion or fire, the base station 140 activates components such as a siren and a telephone dialer that dials a remote call center. An operator at the call center takes an appropriate action such as verifying the alarm condition, if possible, and notifying the local police or fire department. Other actuators, such as automatic door locking and unlocking mechanisms, lights or other components in a home network, and machinery or other equipment, may also be controlled.

The base station 140 is typically a larger component that can be located in an unobtrusive location in a home, such as a closet or basement. For convenience, one or more peripheral user interfaces 120 can be provided that communicate with the base station 140 via a wired or wireless path. Wireless components, which typically communicate by RF signals, are gaining popularity because they are more easily installed. For example, a user interface 120 can be located near the entrance to the building 130.

In the example shown, the user 100 approaches the building 130 when the user desires to enter the building 130. The user carries a wireless tag 110. The tag can be provided, e.g., in a key fob or badge, and carried, including worn, by the user. Using proximity detecting technology (e.g., RF active tags, proximity passive tags), the user interface 120 detects the presence of the tag 110, e.g., within a few feet away from the user interface 120. Optionally, to avoid excessive RF activity and power consumption, the user interface 120 and/or detector 305 can be programmed to enter a sleep mode wherein power consumption is minimized. The user interface 120 and/or detector 305 can then be woken up from the sleep state when an input such as a voice command, or the presence of a wireless tag, is detected. This voice command need not be a specified, verified command but can simply be any spoken phrase or noise that denotes that a user desires to access the user interface 120. Likewise, the tag 110 can assume a sleep mode. In this case, when the user speaks into the user interface 120, the user interface 120 wakes up and begins transmitting a signal to wake up the wireless tag 110. When the wireless tag 110 is awoken, it transmits its identifier for a specified amount of time, then returns to the sleep mode. It is also possible to provide sensors, such as motion sensors, that detect when a user is standing near the user interface 120, to initiate a wake up of the user interface 120.

The user interface 120 obtains the identifier (ID) from the tag and determines whether the tag ID is recognized by the security system. For example, during a training procedure, one or more wireless tag IDs are stored by the security system and, optionally, associated with specific users, such as by their name or employee number. Note that various security protocols may be implemented where specific users are allowed to access only certain portions of a building, such as rooms or floors. This information can be setup during the training procedure to provide a further hurdle to be overcome before the user is granted access to a secured area or item. Moreover, the user need not be identified uniquely but may be identified as belonging to a class of users. Different classes of users can be granted different levels of access.

If the tag ID is recognized by the security system, the user interface 120 prompts the user 100 to provide a biometric input, such as a voice command, fingerprint, iris scan, facial recognition input, or DNA input, e.g., from saliva, sweat or hair. The security system then processes the biometric input by determining whether it matches a previously stored biometric input from the particular user 100. The previously stored biometric input may have been obtained during the above-mentioned training procedure. If there is a match, then the security system is controlled to take a predetermined action such as disarming, thereby allowing the user to enter the building 130 without triggering an alarm. Moreover, when a voice input is used, the action taken can be set based on the specific command given, e.g., "arm", "disarm", "bypass" or the like. Thus, the same voice input can serve the dual purpose of identifying the user and providing a command to the security system.

Figure 2:
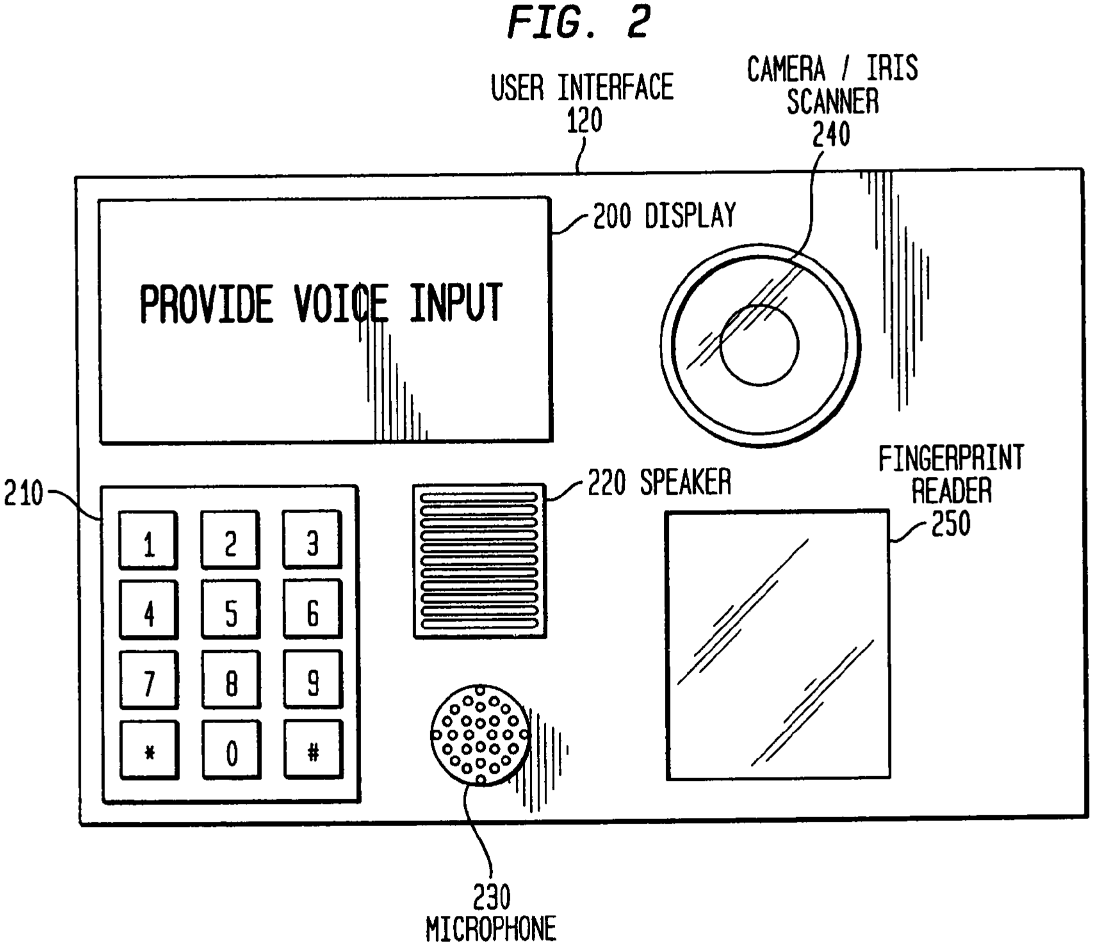
FIG. 2 illustrates an example of a biometric user interface according to one embodiment of the invention.

FIG. 2 illustrates an example of a biometric user interface according to the invention. The user interface 120 includes a display 200 and speaker 220 for providing prompts or other instructions or information to the user. A keypad 210 may be provided for receiving a pass code input from a user, or instructions from a system administrator, for instance. Physical keys or a touch screen image of keys may be provided, for instance. A microphone 230 receives a voice input from the user, while a camera/iris scanner 240 obtains an image of the user's face or iris, for example, and a fingerprint reader 250 obtains an image of the user's finger. The components 230, 240 and 250 therefore are biometric input devices. Generally, biometrics is the science of measuring an individual's physical properties. Other biometric traits that may be measured include signature, hand and finger geometry, gait, vein structure on the back of the hand, ear form, and odor. Biometric traits other than voice are referred to as non-voice biometric traits. The invention may be used with one or more of these or other biometric input devices. Moreover, the biometric input devices need not be integrated into a common housing of the user interface 120 as shown, but may be provided as separate components that communicate their obtained data to a processor of the user interface 120 by wired or wireless communication paths.

Figure 3:
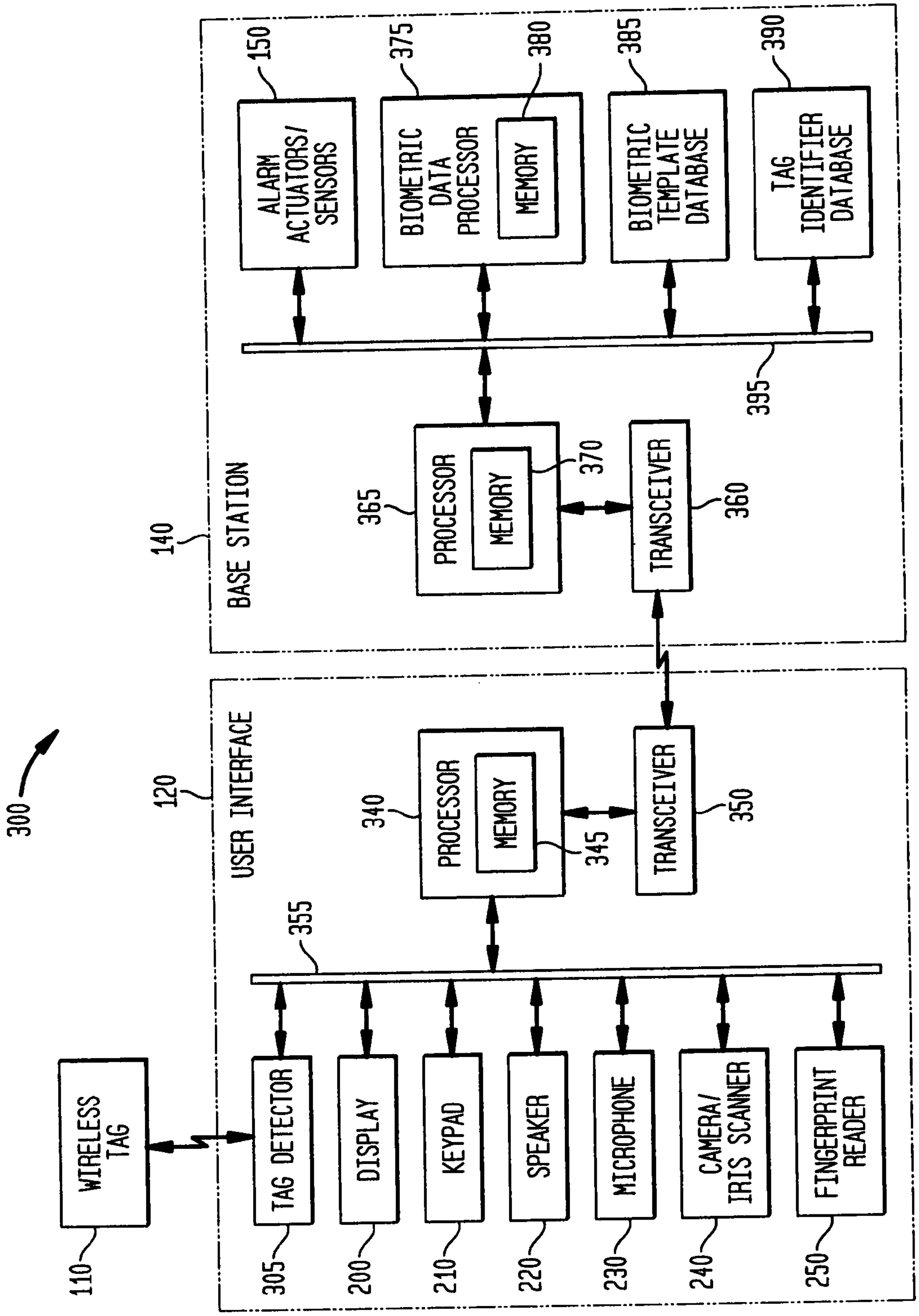
FIG. 3 illustrates an example block diagram of a biometric user interface and base station according to an embodiment of invention, where the biometric data processing occurs in the base station.

FIG. 3 illustrates an example block diagram of a biometric user interface and base station according to an embodiment of the invention, where the biometric data processing occurs in the base station. The user interface 120 includes a tag detector 305 for communicating with the wireless tag 110 that is carried by the user. Optionally, the tag detector 305 is separate from the user interface 120, and communicates its obtained data to a 340 processor of the user interface 120 by wired or wireless communication paths. In one possible configuration, the tag detector 305, display 200, keypad 210, speaker 220, microphone 230, camera/iris scanner 240 and fingerprint reader 250 communicate with a central processor, e.g., control, 340 of the user interface 120 via a bus 355. The processor 340 may manage the overall functioning of the user interface 120 as well as the communication of data with the base station 140 via a transceiver 350. The processor 340 includes a memory 345 that may store software instructions, including software, firmware and/or micro-code, for execution to achieve the functionality described herein. Such a memory resource, and other memory resources discussed herein, may be considered to be program storage devices. The tag detector 305, display 200, keypad 210, speaker 220, microphone 230, camera/iris scanner 240 and fingerprint reader 250 may include separate processing and memory resources as needed. A power source such as a battery may be used to power the components of the user interface 120.

The base station 140 includes a processor, e.g., control, 365 with memory 370 for controlling the overall functioning of the base station 140 as well as the communication of data with the user interface 120 via a transceiver 360. The alarm actuators/sensors 150, along with a biometric data processor 375, including memory 380, a biometric template database 385, and a tag identifier database 390 communicate with the processor 365 via a bus 395, in one possible configuration. The term "database" is meant to encompass any type of data storage resource, regardless of how configured or organized. The biometric template database 385 stores one or more templates of biometric data provided by one or more users, such as during a training procedure, where a user is prompted to provide a biometric input, e.g., by speaking a word or phrase into the microphone 230. The electrical signal from the microphone 230 is digitized by an analog-to-digital (A/D) converter and communicated to the base station 140 for storage in the biometric template database 385.

The biometric data processor 375 executes software instructions stored in the memory 380 to compare biometric data obtained from a user via the user interface 120 to one or more of the templates stored in the biometric template database 385, e.g., using a template matching process. The tag identifier database 390 stores one or more identifiers of wireless tags, e.g., that are obtained by the tag detector 305. The tag identifiers may be indexed to identifiers of respective users to provide the capability to identify a specific user by a specific tag identifier. Likewise, the templates stored in the biometric template database 385 may be indexed by tag identifier and/or user identifier to identify a specific template based on a specific tag or user identifier. Note that the biometric data processor 375, biometric template database 385, and the tag identifier database 390 are shown as being separate for explanation purpose. The functionality described may be provided by any arrangement of processing and storage resources.

Referring again to the user interface 120, the tag detector 305 may periodically emit a signal that is received by the wireless tag 110 when it is within range of the tag detector 305. The wireless tag 110 responds by transmitting a signal that is encoded with its identifier, such as a sequence of bits that corresponds to a string of letters and/or numbers. The tag detector 305 receives the signal and recovers the identifier. The identifier is then communicated from the tag detector 305 to the processor 340, via the bus 355, and to the transceiver 350. The transceiver 350 transmits a wireless signal to the corresponding transceiver 360 of the base station 140. The tag identifier is recovered by the processor 365, which in turn compares the identifier to the previously-stored identifiers in the tag identifier database 390. Comparison of the wireless tag identifier is computationally easy as it typically involves only comparing a string of a few letters or numbers. If there is a match, then it is known that the tag identifier has previously been learned into the security system 300, in which case the processor 365 sends a command to the user interface 120 to instruct it to prompt the user for a biometric input, e.g., using a recorded or synthesized voice message that is reproduced by the speaker 220, and/or a message on the display 200, such as "Provide voice input." One or more of the various biometric input devices 230, 240 and 250 receive biometric data of the user and communicate it to the base station 140, via the processor 340 and transceiver 350.

At the base station 140, the processor 365 provides the biometric data to the biometric data processor 375, and instructs the biometric template database 385 to locate the template that is associated with the particular user identifier or tag identifier for which a match was previously found. The template is then provided to the biometric data processor 375, where a template matching process is carried out to determine if the template matches the input biometric data. The term "match" in this context does not necessarily require an exact match with 100% confidence. The match should provide a sufficient degree of confidence that the template and the input biometric data are from the same person. The biometric data processor 375 informs the processor 365 of whether or not there is a match. If there is no match, the processor 365 may take an action such as alerting security personnel, or simply recording the information provided by the user, and flagging it for later review by a system administrator. Or, the user may be requested to provide a repeat of the same biometric input, or a different type of biometric input. If there is a match, the identity of the user has been verified, and the processor 365 may take a predetermined action such as arming or disarming the security system, or unlocking or locking a door, for example.

Note that, according to the invention, by comparing the input biometric data to a selected template that is expected to match because it was selected based on the wireless tag carried by the user, the processing burden is significantly reduced relative to the case where the input biometric data must be compared to multiple templates to determine which template matches. Furthermore, even when the tag identifier is associated with a group of users rather than a specific user, the number of templates that must be compared is reduced according to the size of the group relative to the population of all possible users.

As indicated, the user interface 120 may be located at the entrance and/or exit to a building, for example, while the base station may be in a secured room inside the building. This approach is convenient since typically more than one user interface may be used which communicates with a common base station 140. Moreover, some of the processing functions can be carried out in the base station 140, thereby allowing the size and cost of the user interfaces 140 to be reduced. However, generally, the functionality carried out by the user interface 120 and base station 140 can be combined into one or more components. For example, a single combined user interface and base station may be used.

Figure 4:
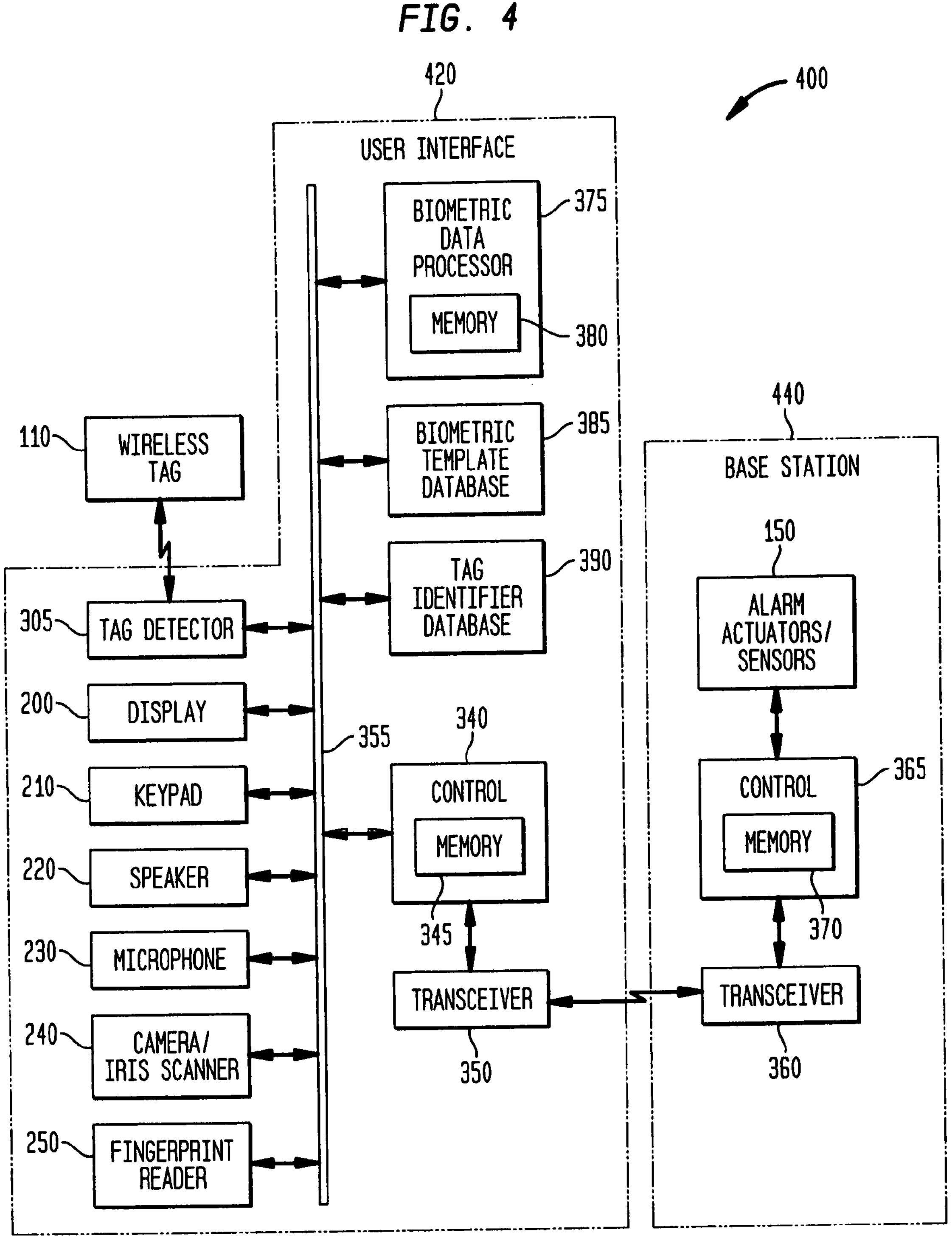
FIG. 4 illustrates an example block diagram of a biometric user interface and base station according to another embodiment of the invention, where the biometric data processing occurs in the biometric user interface.

FIG. 4 illustrates an example block diagram of a biometric user interface and base station in a security system 400 according to the invention, where the biometric data processing occurs in the biometric user interface. In this configuration, the biometric data processor 375 with memory 380, biometric template database 385, and tag identifier database 390 are provided in the user interface 420 rather than in the base station 440. This approach frees the base station 440 from performing the biometric processing and facilitates integration of the invention into existing security systems since a pre-existing base station can be used with only software modifications. In contrast, having the biometric data processing occur in the base station can reduce costs since the processing components are not duplicated in each user interface. Additionally, the same pre-stored tag identifiers and biometric templates are easily accessible to all user interfaces. Moreover, the base station can often be provided in a more secure location than the user interfaces, resulting in greater security.

The present invention will be described below in relation to a user's exit and entry from a building such as a home or business location, in which automatic arming and disarming of the security system is achieved.

Entry Scenario

In an example entry scenario, a user approaches the secured building 130 (FIG. 1) wherein at least one user interface 120 is situated at an entryway. The base station 140 is armed and, upon detecting an alarm condition such as an intrusion, has the capability to generate an alarm signal. The user 100 can be a person desiring to enter the secured building or other location, such as a homeowner desiring to enter a home, or an employee desiring to enter a place of business. The user, with a wireless tag 110 in her/his possession, approaches the entryway. Upon reaching a predetermined distance from the user interface 120, the tag detector 305 (FIG. 3) detects the wireless tag 110 and causes it to transmit its identifier. Optionally, this does not occur until the user interface 120 is awoken from a sleep state, such as by a voice command or other noise from the user 100. The tag detector 305 receives the tag identifier, and the tag identifier is compared to the identifiers in the tag identifier database 390 for authentication.

The user may be prompted to provide a biometric input immediately upon the detection of the wireless tag 110 by the tag detector 305, or the biometric input may not be requested until after the tag identifier has been matched to an identifier in the tag identifier database 390. The user can be prompted audibly via the speaker 220, and/or visually, via the display 200. For example, the user may provide the biometric input by speaking a disarm confirmation phrase. The spoken phrase is received and transmitted to the base station 140, for instance, for comparison with one or more templates at the biometric data processor 375. The biometric data processor 375 compares the user's voice and the identifier of the wireless tag 110 to a biometric model of the user's voice and wireless tag identifiers, respectively, stored within the databases 385 and 390. Any type of voice-matching software may be used for the comparison.

If the biometric data processor 375 determines that the user's voice matches a voice template, and it is also determined that the detected wireless tag identifier matches a prestored wireless tag identifier, then the base alarm station 140 will disarm, thereby allowing the user to enter the building without triggering an alarm. A confirmation message may be provided to the user that the system had been disarmed via the display 200 and/or speaker 220.

In particular, one or more voice models or other biometric templates may be stored for a security system. For example, at a residence, voice models may be stored for persons that are authorized to enter the home. At a business, voice models may be stored for persons that are authorized to enter the business. To set up the system, a phrase, e.g., one or more words, is recorded by each user and stored in the biometric template database 385 as the voice model. This may occur during a training procedure, for instance. The same or different phrases can be spoken by different users. The phrase can be a secret phrase, such as a code word known only to the user, or simply the user's name or employee number, for instance. Moreover, several different phrases can be stored in the biometric template database 385 for a given user, and a different action associated with each phrase, e.g., “arm”, “disarm”, “bypass” and so forth. The voice commands can therefore be carried out when the identity of the user is verified to allow the user to control the security system as well as being recognized by the system.

Further, in setting up the system, the wireless tags 110 may be assigned to specific users, in which case the tag identifier database 390 is configured to associate specific tag identifiers with specific users. During the entry/exit process, a further check can be made to ensure that there is a match between the authenticated confirmation phrase and the tag identifier. In this case, a user who has the wrong tag is not granted access. Or, the wireless tags may be given to different users without regard to the specific identity of the user, in which case the user will be granted access if the tag identifier is recognized and the confirmation phrase is authenticated. In fact, multiple tags having the same identifier may be used with one security system. However, for the highest level of security, the tag identifiers should be specific-to-specific users. The user can also be required to enter a conventional pass code using keys on the keypad 210 to gain access.

Exit Scenario

In an exit scenario, it is assumed that a user is positioned inside of the building in which the base station 140 and the user interface 120 are located, and that the base station 140 is disarmed. The user with a wireless tag 110 in her/his possession walks towards an exit, where the user interface 120 is located. When the user is within a predetermined distance of the user interface 120, the tag detector 305 detects the wireless tag 110. Optionally, this does not occur until the user interface 120 and/or tag detector 305 is awoken from a sleep state, such as by a voice command or other noise from the user. The tag detector 305 receives the tag's identifier, which is, in turn, transmitted to the processor 365 for matching with an identifier in the tag identifier database 390.

Upon the detection of the wireless tag 110 by the tag detector 305 of the user interface 120, which may be considered to be remote from the base station 140, the user interface will audibly, via the speaker 220, and/or visually, via the display 200, prompt the user to provide a biometric input such as by speaking an activation phrase into the microphone 230. The user may be prompted to provide the biometric input immediately upon the detection of the wireless tag 110 by the tag detector 305, or the biometric input may not be requested until after the tag identifier has been matched to an identifier in the tag identifier database 390. The activation phrase spoken by the user is received and transmitted to the biometric data processor 375, which attempts to match the spoken activation phrase to a predetermined activation phrase or template that is stored within the biometric template database 385. If the biometric data processor 375 determines that the spoken activation phrase matches a template, then an arming confirmation of the base station 140 is broadcast to the user via the speaker 220 and/or display 200, and the alarm base station 140 is armed. Thus, the security system is automatically armed when the user exits the building.

Figure 5:
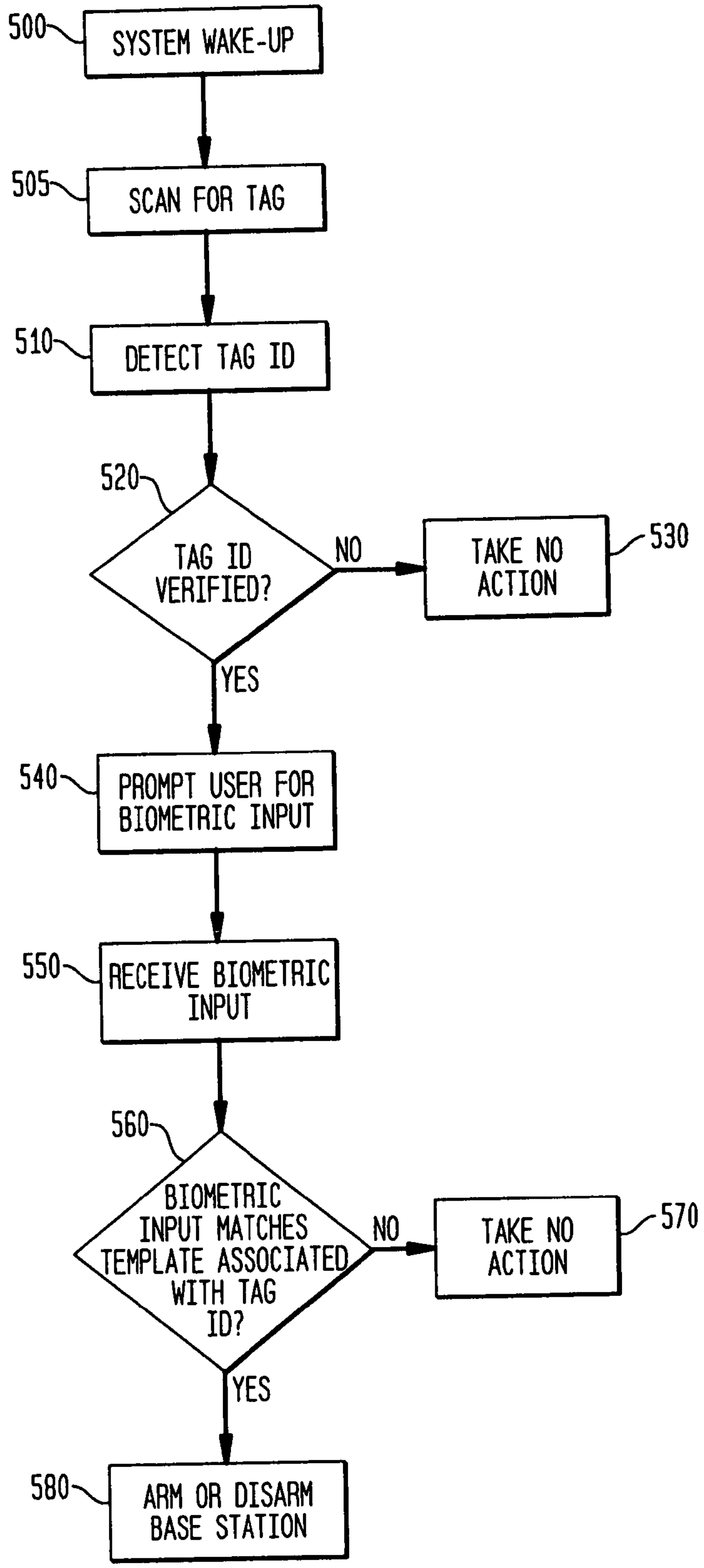
FIG. 5 illustrates an example method for arming or disarming a base station in a security system according to an embodiment of the invention.

FIG. 5 illustrates an example method for arming or disarming a base station in a security system according to the invention. At block 500, the system is woken up from a sleep state such as by the user speaking. At block 505, the tag detector 305 of the user interface 120 scans an area such as near the entrance or exit of a building to determine if there are any wireless tags present. At block 510, a tag identifier (ID) is detected. At block 520, if the tag ID is verified as matching an identifier in the tag ID database 390, the user is prompted for a biometric input (block 540). If the tag ID is not verified, no action is taken (block 530). Or, an action may be taken such as notifying security personnel or requesting that the user provide an additional biometric input. At block 550, a biometric input is received from the user. At block 560, if the biometric input matches a template that is associated with the tag identifier, or a user identifier associated with the tag identifier, a predetermined action is taken such as arming or disarming the base station (block 580).

Figure 6:
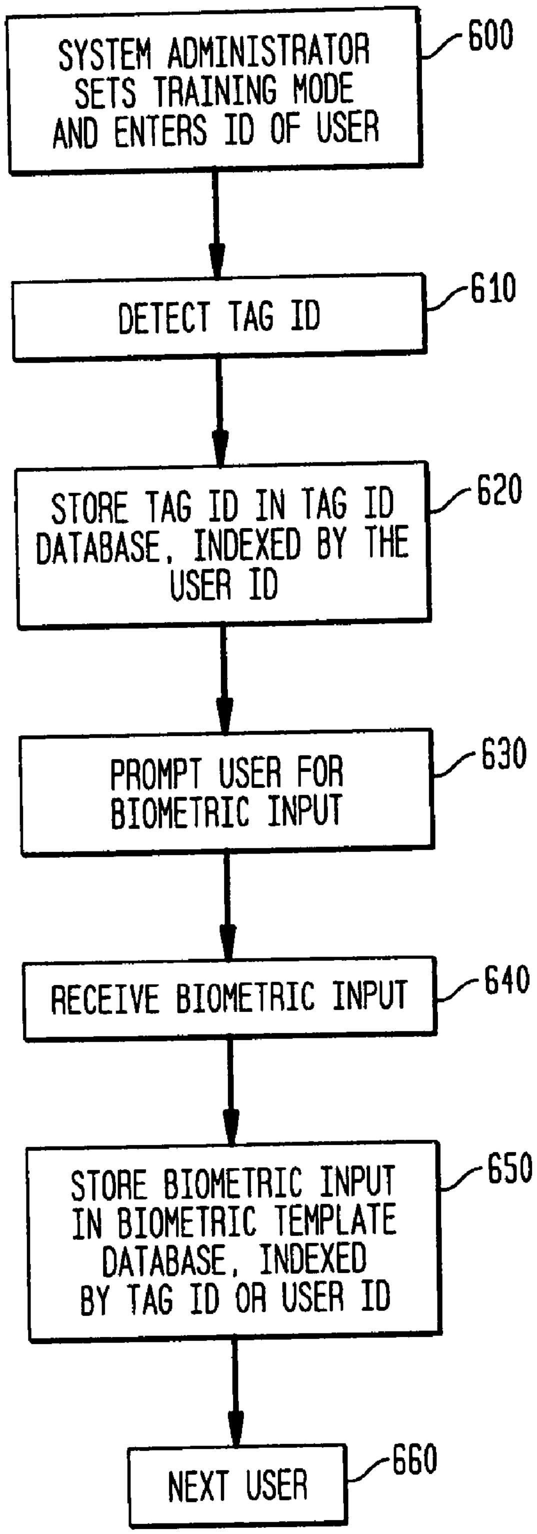
FIG. 6 illustrates an example method for training a security system to recognize a user according to an embodiment of the invention.

FIG. 6 illustrates an example method for training a security system to recognize a user according to the invention. The training procedure is used generally to setup the security system with tag identifiers and biometric templates. At block 600, a system administrator, e.g., a designated and authorized person such as a security manager in a company, or a parent in a home, sets a training mode in the alarm system and enters an identifier of a user who is to be learned into the system. For example, this may be achieved by entering a pass code on the keypad 210 of the user interface. At block 610, the wireless tag that is to be assigned to the user is placed within range of the tag detector 305 so that the tag identifier can be detected. At block 620, the tag ID is stored in the tag ID database 390 and indexed to the user ID. At block 630, the user is prompted to provide a biometric input. Note that multiple biometric inputs of the same or different types may be input. This gives the user the option of using the most convenient type. For instance, a voice input and a fingerprint input may be provided. In the winter, it may be inconvenient to remove gloves to provide a fingerprint, while other times the user may have a sore throat, which makes it difficult to speak. At block 640, the biometric input is received. At block 650, the biometric input is stored in the biometric template database 385, and indexed by the tag identifier and/or user identifier. At block 660, the next user is processed.

The security system may also be configures to identify security privileges accorded to each user, such as identifiers of the rooms in a building in which the user is authorized to enter. In this way, a user is permitted to enter a room only when the tag identifier, biometric data and security privilege data are in order.

Accordingly, it can be seen that the invention provides a security system with biometric authentication such as voice authentication, and wireless tag detection capabilities, which authenticates both the user and a wireless tag carried by the user. Note that the examples above indicate how the invention may be used to allow a user to enter or exit a building with automatic disarming and arming, respectively, of a security system. However, the invention is suitable generally for controlling access to any secured location or item, such as a safe, cabinet, weapon, or the like.

Figure 7:
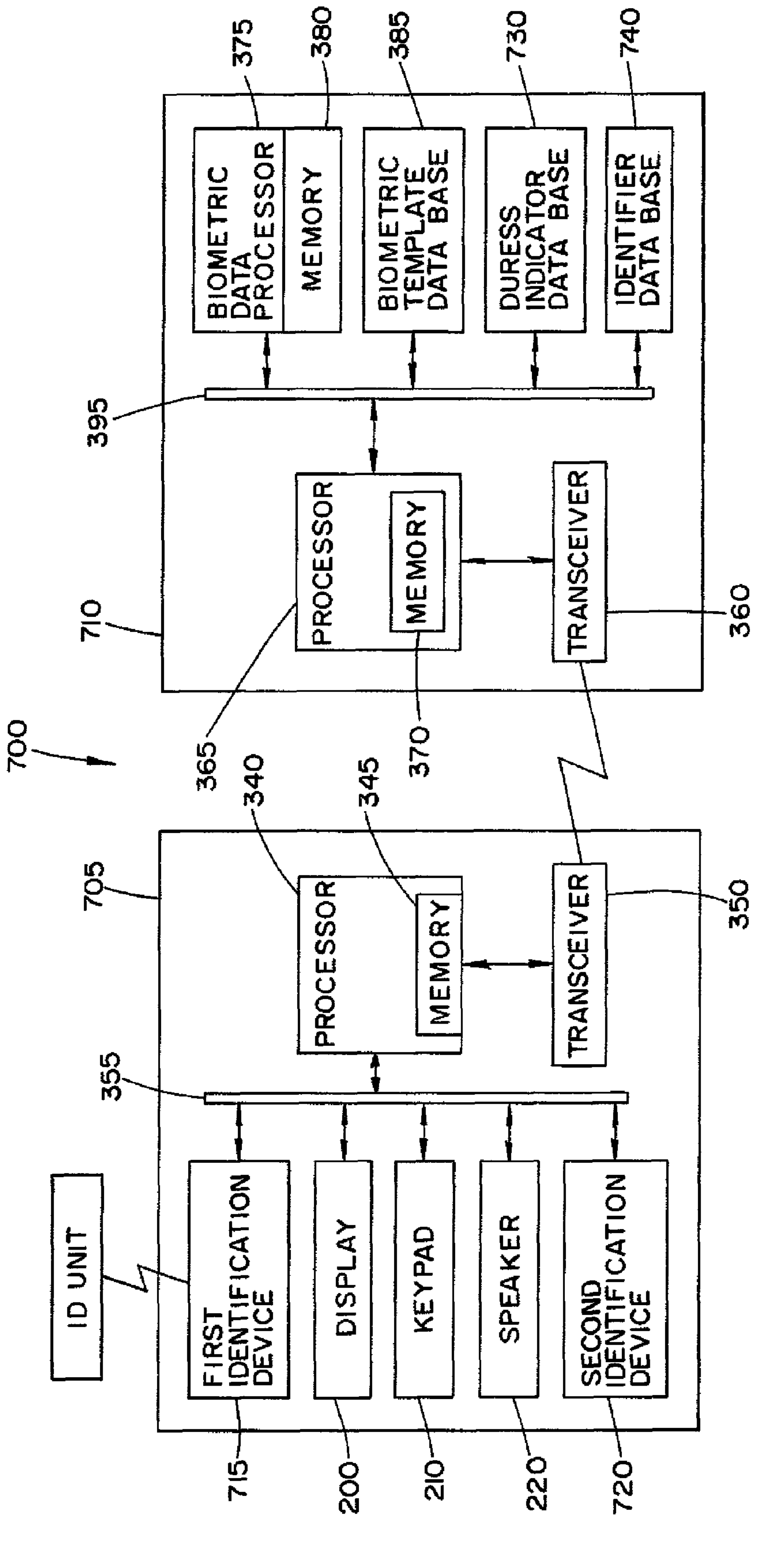
FIG. 7 illustrates an example block diagram of a biometric user interface and base station according to a second embodiment of the invention, where the biometric data processing occurs in the base station.

FIG. 7 illustrates an example block diagram of a biometric user interface and base station according to the second embodiment of the invention, where the biometric data processing occurs in the base station. For purposes of the description of the second embodiment of the invention, the same reference numbers are used for like elements.

The biometric user interface and base station, according to the second embodiment of the invention, is not only used to verify the identity of an user, but also to determine whether the user is being forced to disarm the base station by an intruder. In other words, the biometric user interface and base station is used to detect if the user is under duress.

The user interface 705 in the second embodiment includes a first identification device 715 for receiving a unique identifier associated with a particular user. The unique identifier can be unique wireless tag or access card with an identifier stored or written on the tag. Additionally, the unique identifier can simply be a unique passcode assigned to a particular user. If the unique identifier is a wireless tag or access card, the first identification device 715 communicates with the wireless tag 110 that is carried by the user. The first identification device 715 can actively interrogate the wireless tag, if the tag is passive. Optionally, the first identification device 715 is separate from the user interface 705, and communicates its obtained data to a 340 processor of the user interface 705 by wired or wireless communication paths. The user interface 705 includes a display 200, keypad 210 and speaker 220. If the unique identifier is a unique passcode, the keypad 210 can act as the first identification device 715. The user interface 705 also includes a second identification device 720. The second identification device 720 can be any biometric device capable of receiving biometric data. For example, the microphone 230, camera/iris scanner 240 and fingerprint reader 250 described in the first embodiment of the invention can be used. The user interface 705 can include more than the second identification device 720 for added security. Optionally, the second identification device 720 is separated from the user interface 705, and communicates its obtained data to a 340 processor of the user interface 705 by wired or wireless communication paths.

In one possible configuration, as depicted in FIG. 7, the first identification device 715, display 200, keypad 210, speaker 220, and second identification device 720 communicate with a central processor, e.g., control 340 of the user interface 705 via a bus 355. The processor 340 may manage the overall functioning of the user interface 705, as well as the communication of data with the base station 740 via a transceiver 350. The processor 340 includes a memory 345 that may store software instructions, including software, firmware and/or micro-code, for execution to achieve the functionality described herein. Such a memory resource, and other memory resources discussed herein, may be considered to be program storage devices. The first identification device 715, display 200, keypad 210, speaker 220, and second identification device 720 may include separate processing and memory resources as needed. A power source such as a battery may be used to power the components of the user interface 120.

The base station 710 includes a processor, e.g., control 365 with memory 370 for controlling the overall functioning of the base station 710, as well as the communication of data with the user interface 705 via a transceiver 360. Although not depicted, the base station can include similar alarm actuators/sensors 150 as the base station of the first embodiment of the invention. The base station 710 includes biometric data processor 375, including memory 380, a biometric template database 385, duress indicator database 730 and an identifier database 740. In one possible configuration the biometric data processor 375, a biometric template database 385, duress indicator database 730 and an identifier database 740 communicate with the processor 365 via a bus 395. The term "database" is meant to encompass any type of data storage resource, regardless of how configured or organized. Additionally, while the three databases, biometric, duress and identifier have been depicted as being separate databases, one database can be created including the information from all three separate databases, indexed by the unique identifier.

The biometric template database 385 stores one or more templates of biometric data provided by one or more users, such as during a training procedure, where a user is prompted to provide a biometric input, e.g., by speaking a word or phrase into the microphone 230, placing a finger on the fingerprint reader 250, looking into a iris scanner or being photographed by a facial features detector or camera 240.

The duress indicator database 730 stores one or more templates of biometric data provided by one or more users, which will be subsequently used by the particular user to include a forced entry of the data under duress. The duress indicator will be different from the biometric template data that is stored in the biometric database 385. However, the duress indicator is input in the same manner as the biometric data for the biometric template database, i.e., during a training procedure, where a user is prompted to provide a biometric input, e.g., by speaking a word or phrase into the microphone 230, placing a finger on the fingerprint reader 250, looking into a iris scanner or being photographed by a facial features detector or camera 240. For example, if the second identification device 720 is a microphone 230, then the duress indicator will be a different phrase from what is used to arm or disarm the base station 710.

If the second identification device 720 is a fingerprint reader, then the duress indicator could be a different finger than what is used to arm or disarm the base station 710 (different hand). Similarly, if the second identification device 720 is an iris or retinal scanner, the duress indicator can be the other eye.

The biometric data for the biometric template is stored in the biometric template database and the biometric data for the duress indicator is stored in the duress indicator database. The unique identifier indexes both databases. The input biometric data is converted into a suitable format for storage, prior to storage. For example, an electrical signal from the second identification device 720, e.g., microphone 230, is digitized by an analog-to-digital (A/D) converter and communicated to the base station 710 for storage in the biometric template database 385.

The biometric data processor 375 executes software instructions stored in the memory 380 to compare biometric data obtained from a user via the second identification device 720 to one or more of the templates stored in the biometric template database 385, e.g., using a template matching process and one or more duress indicators in the duress indicator database.

The identifier database 740 stores one or more identifiers associated with one or more person. In one embodiment, the identifier database 740 stores identifiers of wireless tags, e.g., that are obtained by the first identification device 715 during training or learning. The tag identifiers may be indexed to identifiers of respective users to provide the capability to identify a specific user by a specific tag identifier. Additionally, the tag or access card identifiers can be manually input via the keypad 210 during the learning or training process. In another embodiment, the identifiers are unique passcodes assigned to the user, and are stored in the identifier database 740. The processor 365 executes software instructions stored in the memory 370 to compare the identifier obtained from a user via the first identification device 715 to the identifier stored in the identifier database 740.

Note that the biometric data processor 375, biometric template database 385, and the tag identifier database 390 are shown as being separated for explanation purposes. The functionality described may be provided by any arrangement of processing and storage resources.

In an embodiment, the first identification device 715 can operate as a tag detector in a manner as described above. The first identification device 715 may periodically emit an interrogation signal that is received by wireless tag. The tag will modulate a responsive signal that includes an encoded identifier, i.e., sequence of bits with letters or numbers. The first identification device 715 receives the signal, demodulated and decrypts the signal to recover the unique identifier. The identifier is communicated or transmitted, via the bus 355, to the processor 340. The identifier can be temporarily stored in memory 345. The identifier is then communicated to transceiver 350. The transceiver 350 transmits a wireless signal to the corresponding transceiver 360 of the base station 710. The identifier is recovered by the processor 365, which in turn compares the identifier to the previously-stored identifiers in the identifier database 740. If there is a match, then it is known that the identifier has previously been learned, i.e., authorized, in which case the processor 365 sends a command to the user interface 705 to instruct it to prompt the user for a biometric input from the second identification device 720. The user interface 705 will have a plurality of recorded instructions. A set of recorded instructions will be directed to prompting the user for biometric input. The instructions can be tailored to the specific biometric input device used as the second identification device 720, camera, fingerprint detector, microphone, iris retinal scanner, and facial recognition device. The instruction will be output to the user via a speaker 220, e.g., using a recorded or synthesized voice message, and/or a message on the display 200. For example, the instruction can be “Provide voice input” or “Place finger on reader”. One or more of the various biometric input devices can be used as the second identification device 720. The second identification device 720 receives biometric data of the user and communicates it to the base station 710, via the processor 340 and transceiver 350.

At the base station 710, the processor 365 provides the biometric data to the biometric data processor 375, and instructs duress indicator database 730 and the biometric template database 385 to locate the duress indicator and template that is associated with the particular identifier for which a match was previously found for the particular second identification device, respectively. The duress indicator and template are then provided to the biometric data processor 375, where duress indicator and template matching processes are is carried out to determine if the duress indicator has been entered or the template matches the input biometric data. The biometric data processor 375 informs the processor 365 of whether or not there is a match for either the duress indicator or biometric template. If there is no match, the processor 365 may take an action such as alerting security personnel, or simply recording the information provided by the user, and flagging it for later review by a system administrator. Or, the user may be requested to provide a repeat of the same biometric input, or a different type of biometric input. If there is a match for the duress indicator, while the identity of the user has been verified the user is under duress, and the processor 365 will cause an alert signal or silent alarm signal to be sent to a central monitoring station (not shown). The silent alarm signal will allow the operator at the central monitoring station to take the appropriate action, e.g., call the police. However, the base station 710 will disarm the security system, or unlock a door not to alert the intruder or burglar that a silent alarm has been triggered.

If there is a match with the biometric template, the identity of the user has been verified, and the processor 365 may take a predetermined action such as arming or disarming the security system, or unlocking or locking a door, for example.

The user interface 705 may be located at the entrance and/or exit to a building, for example, while the base station 710 may be in a secured room inside the building such that the user interface 705 and base station 710 are remote from each other. In another embodiment, the functionality carried out by the user interface 705 and base station 710 can be combined into one or more components. For example, a single combined user interface and base station may be used. The single combined user interface and base station will be a similar configuration as the system depicted in FIG. 4 and, therefore will not be described.

Figure 8:
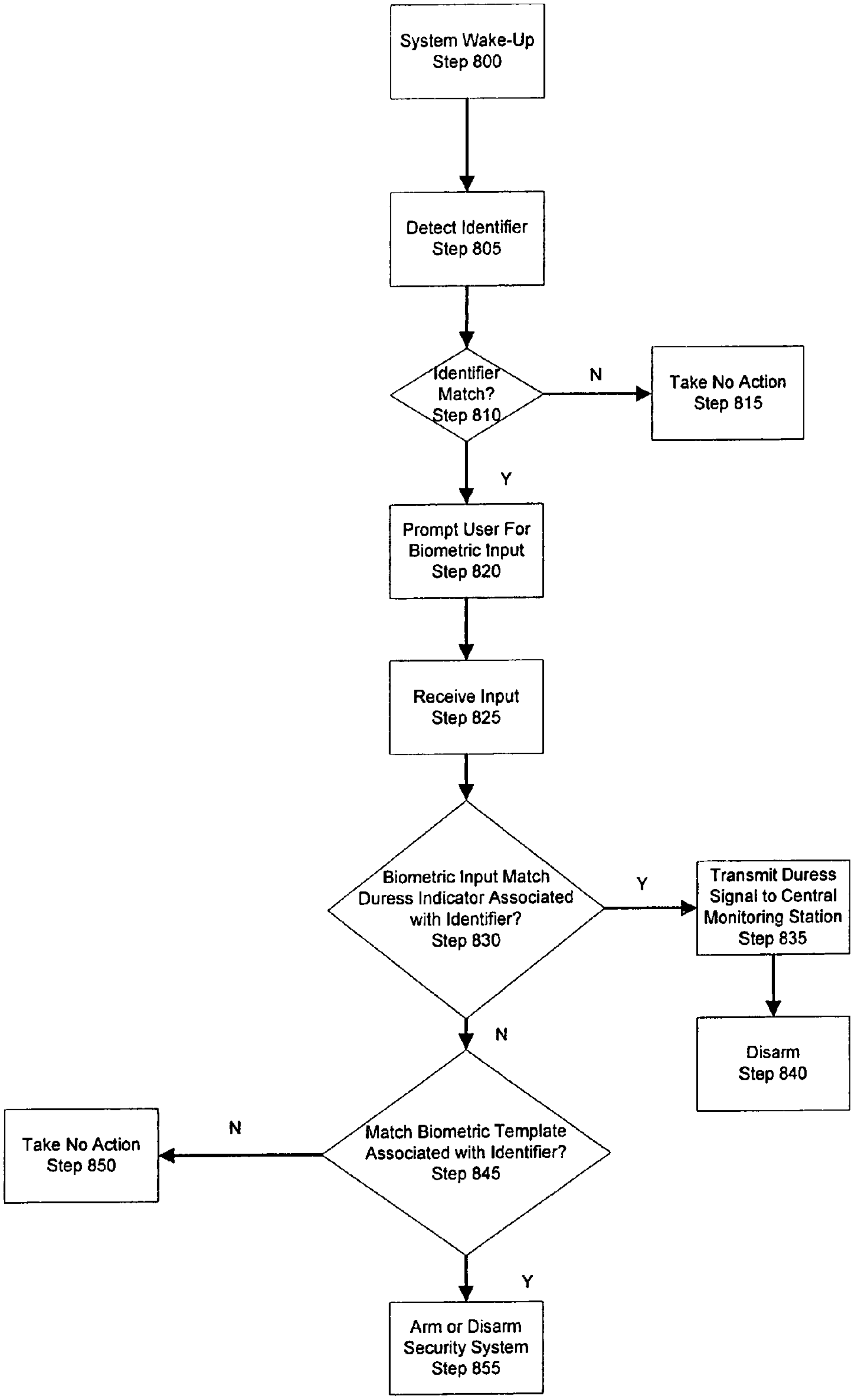
FIG. 8 illustrates an example method for disarming a base station in a security system according to the second embodiment of the invention.

FIG. 8 illustrates a method of verifying the identity of a user and detecting if the user is under duress according to the invention. At step 800, the user interface 705 is woken up from a sleep state by a user action. For example, a user can speak into a microphone or touch the display 200. At step 805, the first identification device 715 detects the identifier from the user. In one embodiment, the first identification device 715 scans an area in close proximity, e.g., near the entrance or exists of a building to determine if there are any wires tags or access cards present. Alternatively, the first identification device 715 will passively wait for the input, i.e., passcode or access card scanned. The processor 365 will determine if the detected identifier matches a prestored identifier from the identifier database 740, at step 810. If the identifier does not match, no action is take, step 815. The status of the base station 715 is not changed. Optionally, a flag is set and a counter is incremented. The flag and counter can be used to generate an alarm after a preset number of non-matches. Additionally, a signal can be optionally transmitted to a central monitoring station. If the identifier matches, e.g. is verified, the user is prompted for at least one biometric input, step 820. At step 825 the second identification device 720 receives the biometric input. The processor 365 will determine if the input biometric data matches a duress indicator that is associated with the detected identifier and type of second identification device stored in the duress indicator database 740, step 830. If there is a match, the processor 365 will cause the transceiver to transmit a silent alarm signal to a central monitoring station, at step 835. Additionally, the processor will perform the intended control operation, e.g., disarm the base station, step 840.

If at step 830, the processor 365 determines that the input biometric data does not matches the prestored duress indicator, the processor 365, then determines if the biometric data matches a biometric template associated with the identifier and second identification device 720 stored in the biometric template database, at step 845. If the biometric data does not match, no action is take, step 850. The status of the base station 715 is not changed. Optionally, a flag is set and a counter is incremented. The flag and counter can be used to generate an alarm after a preset number of non-matches. The user can be requested to provide more biometric data or different biometric data. Additionally, a signal can be optionally transmitted to a central monitoring station. At step 845, if the biometric data matches the biometric template associated with the identifier, a predetermined action is taken such as arming or disarming the base station, at step 855. The user is verified and no duress is detected. Operation of this method assures that no security breach occurs.

Figure 9:
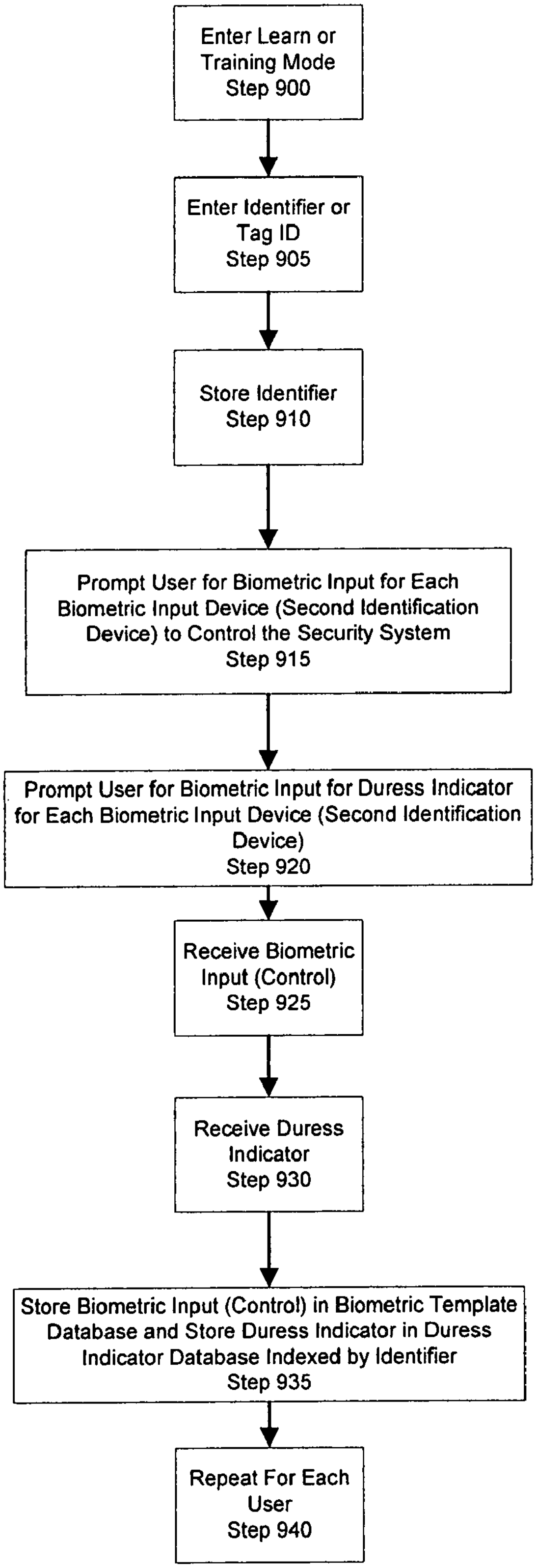
FIG. 9 illustrates an example method for training a security system to recognize a user according to the second embodiment of the invention.

FIG. 9 illustrates a method for configuring the security system or base station to recognize a user according to the second embodiment of the invention. This procedure is used to setup the security system for identification using biometric technology and unique identifiers.

At block 900, a system administrator, e.g., a designated and authorized person such as a security manager in a company, or a parent in a home, sets a training or learn mode in the user interface 705 and enters an identity of a user who is to be learned into the system 700, e.g., name. At step 905, the wireless tag that is to be assigned to the user is placed within range of the first identification device 715 so that the tag identifier can be detected. Alternatively, the identifier can be manually entered into the keypad 210. In another embodiment, a passcode can be entered. At block 910, the identifier is stored in the identifier database 740 and indexed to the name. At block 915, the user is prompted to provide a biometric input for the biometric template. At step 920, the user is prompted to provide a biometric input for the duress indicator. The duress indicator is different from the biometric template. While steps 915 and 920 are depicted as being successive, step 920 can occur after step 925. If the second identification device 720 includes multiple biometric inputs, the user can choose which type of biometric data to input. The user can input more than one type of biometric data. For instance, a voice input and a fingerprint input may be provided. Both biometric data will be stored in the biometric template and will be used for verification. At step 925, the biometric data will be received and processed, i.e., converted into a format suitable for storage. The user will then input a different biometric data for the duress indicator. For example, the user can select the phrase "dog" as the biometric input for voice data. At step 930, the duress indicator will be received and processed, i.e., converted into a format suitable for storage.

At block 935, the biometric data(s) and will be stored as one or more biometric templates in the biometric template database 385 and the duress indicator(s) will be stored in the duress indicator database 730 and indexed by the identifier. At block 940, the process is repeated for each user.

Figure 10:
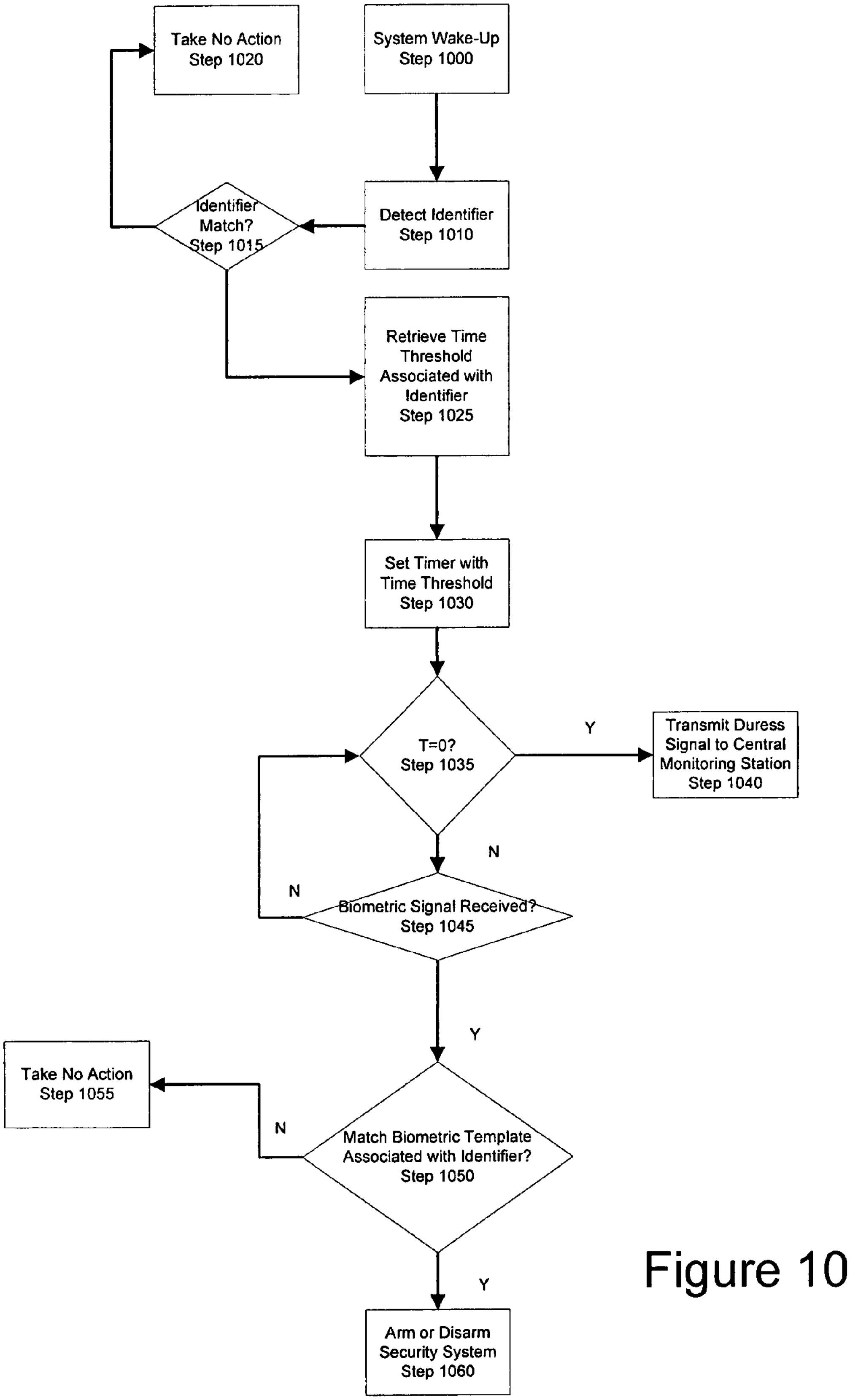
FIG. 10 illustrates an example method for disarming a base station in a security system according to the third embodiment of the invention.

FIG. 10 illustrates a method of arming or disarming the security system using the dual verification system according to a third embodiment of the invention. According to the third embodiment of the invention, a silent alarm signal is generated if the time between the input in the first detection device and the input in the second detection device is greater than a preset threshold. The preset threshold can be preset for each authorized person. Alternatively, a default threshold can be used. For example, if the time between the input of a passcode or wireless identification tag and the input of the fingerprint or voice input is greater than 20 seconds, the base station will send a signal to the central monitoring station.

At step 1000, the user interface 705 is woken up from a sleep state by a user action. For example, a user can speak into a microphone or touch the display 200. At step 1010, the first identification device 715 detects the identifier from the use. The processor 365 will determine if the detected identifier matches a prestored identifier from the identifier database 740, at step 1015. If the identifier does not match, no action is take, step 1020. The status of the base station 715 is not changed. Optionally, a flag is set and a counter is incremented. The flag and counter can be used to generate an alarm after a preset number of non-matches. Additionally, a signal can be optionally transmitted to a central monitoring station. If the identifier matches, e.g. is verified, a preset time threshold is retrieved from a threshold database, at step 1025. The time threshold is an allowable time period between inputs, i.e., between the first input and the biometric input. The time threshold is only known to the authorized used. If the user is under duress, the user can wait for a period of time longer than the time threshold such that a silent alarm is generated. The processor 365 will set a timer with the preset time threshold that corresponds to the identifier detected in step 1010. If the value of the timer is greater than zero, at step 1035, the processor will wait for a biometric input. If the value of the timer equals zero, meaning that the time period has expired, the processor 365 will transmit a signal to a central monitoring station indicating a silent alarm.

If a biometric input is received by the second identification device 720, the processor will determine if the data was input in time, i.e., T>0, steps 1035 and 1045. When a signal is received, the processor will determine if the biometric input matches a biometric template associated with the identifier that is stored in the biometric template database, at step 1050. The matching process is the same as in the first and second embodiments. If there is a match, processor will perform the intended control operation, e.g., disarm the base station, step 1060. If the biometric data does not match, no action is taken, step 1055. The status of the base station 715 is not changed.

Optionally, a flag is set and a counter is incremented. The flag and counter can be used to generate an alarm after a preset number of non-matches. Operation of this method assures that no security breach occurs.

The system according to the third embodiment of the invention is similar to the system illustrated in FIG. 7, except the processor 365 includes a timer and that is a threshold database.

In another embodiment, a combination of the second and third embodiments can be used to verify a user and confirm that a user is not under duress. In this embodiment, both a time threshold and a duress indicator are used. A silent alarm signal is transmitted to a central monitoring station if a timer expires prior to any input to the second identification device 720 or if the user inputs the duress indicator into the second identification device 720. The timer is initially set when the first identification device 715 detects a first input. The timer is set to a time threshold corresponding to the detected identifier, detected by the first identification device 715 and determined by the processor 365.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

The invention claimed is:

1. A biometric security system comprising:

a first identification device for detecting an identifier associated with a user;

a second identification device for obtaining biometric data of the user;

a database for storing said identifier and at least one biometric template and at least one duress indicator; and a processor for detecting an identity of the user and whether the user is not under duress, wherein said identity is determined by matching the detected identifier with a stored identifier and matching the biometric data with the at least one biometric template, wherein said duress is determined by matching the biometric data with said at least one duress indicator, wherein said processor controls the security system based upon said determination, wherein said processor further includes a timer, said timer is activated when said first identification device detects said identifier and said timer is stopped when said second identification device detects said biometric data, and wherein if the timer indicates a value greater than a predetermined threshold value when said second identifier obtains said biometric data, said processor determines that said user is under duress and transmits a duress signal to a central monitoring station.

2. The biometric security system of claim 1, wherein when said processor determines that said biometric data matches said at least one duress indicator, said processor transmits a duress signal to a central monitoring station.

3. The biometric security system of claim 2, wherein said processor controls the security system by at least disarming the security system.

4. The biometric security system of claim 1, wherein said database stores a plurality of duress indicators, said plurality of duress indicators are different from said at least one biometric template; and said at least one duress indicator is selected from the database according to the detected identifier.

5. The biometric security system of claim 1, wherein said at least one duress indicator is selected from the database according to the type of second identification device.

6. The biometric security system of claim 1, wherein said second identification device includes a speaker and a display for prompting said user to provide said biometric data, after said processor determines whether said detected identifier matches a stored identifier.

7. The biometric security system of claim 1, wherein said biometric data comprises voice data.

8. The biometric security system of claim 7, wherein said duress indicator is a specific voice data pattern.

9. The biometric security system of claim 1, wherein said biometric data comprises non-voice input.

10. The biometric security system of claim 9, wherein said non-voice input includes a fingerprint.

11. The biometric security system of claim 10, wherein said at least one biometric template is a fingerprint of a finger of the user and said duress indicator is a fingerprint of a different finger of the user.

12. The biometric security system of claim 9, wherein said non-voice input includes facial feature imprint.

13. The biometric security system of claim 12, wherein said at least one biometric template is an iris and retinal pattern of a specific eye of said user and said duress indicator is an iris and retinal pattern of the other eye of said user.

14. The biometric security system of claim 1, where said first and second identification devices are located near an entrance to a building, and said processor is located remotely from said first and second identification devices to prevent tampering.

15. The biometric security system of claim 14, where said first and second identification devices include a wireless communication device to transmit the detected identifier and biometric data to said processor.

16. A method of using a security system to verify an identity of a user and to confirm whether a user is not under duress, the method comprising the steps of:

detecting an identifier of a wireless tag carried by the user;

activating a timer when said identifier of said wireless tag is detected;

verifying an identity of the user by determining whether the detected identifier matches an identifier prestored in a database;

detecting biometric data of the user;

stopping said timer when said biometric data is detected;

determining whether said timer indicates a value greater than a predetermined threshold value when said timer is stopped; and if said timer indicates a value larger than said predetermined threshold value when said tinier is stopped, then transmitting a duress signal to a central monitoring station;

if said timer does not indicate a value greater than said predetermined threshold when said timer is stopped, then:

verifying whether said biometric data matches a biometric template stored in said database;

arming or disarming said security system if said biometric data matches said biometric template;

verifying whether said biometric data matches a duress indicator prestored in said database; and transmitting a duress signal to said central monitoring station if said biometric data matches said duress indicator.

17. The method of using a security system to verify an identity of the user and to confirm that a user is not under duress according to claim 16 further comprising the step of:

disarming the security system if the identity of the user is verified.

18. The method of using a security system to verify an identity of the user and to confirm that a user is not under duress according to claim 17, wherein the security system is disarmed after the transmission of the duress signal.

19. The method of using a security system to verify an identity of the user and to confirm that the user is not under duress according to claim 16 further comprising the step of storing at least one identifier, at least one biometric template and at least one duress indicator in a database.

* * * * *